(12) United States Patent
Yajima et al.

(10) Patent No.: US 11,820,113 B2
(45) Date of Patent: Nov. 21, 2023

(54) SEALANT FILM, MULTILAYER FILM INCLUDING SAME AND PACKAGING BAG

(71) Applicant: TOPPAN PRINTING CO., LTD., Tokyo (JP)

(72) Inventors: Shunsuke Yajima, Tokyo (JP); Masanobu Yoshinaga, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 26 days.

(21) Appl. No.: 17/386,458

(22) Filed: Jul. 27, 2021

(65) Prior Publication Data

US 2021/0354430 A1 Nov. 18, 2021

Related U.S. Application Data

(63) Continuation of application No. 16/251,483, filed on Jan. 18, 2019, which is a continuation of application No. PCT/JP2017/025776, filed on Jul. 14, 2017.

(30) Foreign Application Priority Data

Jul. 20, 2016 (JP) ................................. 2016-142373
Oct. 31, 2016 (JP) ................................. 2016-212817
Oct. 31, 2016 (JP) ................................. 2016-212818

(51) Int. Cl.
*B32B 27/08* (2006.01)
*B65D 65/40* (2006.01)
(Continued)

(52) U.S. Cl.
CPC .............. *B32B 27/08* (2013.01); *B32B 27/00* (2013.01); *B32B 27/32* (2013.01); *B32B 27/325* (2013.01);
(Continued)

(58) Field of Classification Search
None
See application file for complete search history.

(56) References Cited

U.S. PATENT DOCUMENTS 5,786,050 A 7/1998 Otsuka et al.
5,912,070 A 6/1999 Miharu et al.
(Continued)

FOREIGN PATENT DOCUMENTS

CN 103958639 A 7/2014
CN 104943309 A 9/2015
(Continued)

OTHER PUBLICATIONS

Sasaki—JP 2000-327756 A—MT—cycloolefin polymerization—2000 (Year: 2000).*
(Continued)

*Primary Examiner* — John Vincent Lawler
(74) *Attorney, Agent, or Firm* — Foley & Lardner LLP

(57) ABSTRACT

A sealant film including a polyolefin layer containing polyolefin as a main ingredient, and a polycycloolefin layer as an outermost layer containing polycycloolefin as a main ingredient. The polycycloolefin contains two or more kinds of structural units selected from a structural unit (A) derived from a dicyclopentadiene compound, a structural unit (B) derived from a tetracyclododecene compound, and a structural unit (C) derived from a norbornene compound, and the polycycloolefin has a glass transition temperature less than or equal to 80° C.

9 Claims, 10 Drawing Sheets

(51) Int. Cl.
  *B65D 81/24* (2006.01)
  *B32B 27/00* (2006.01)
  *B32B 27/32* (2006.01)
  *B32B 27/36* (2006.01)
  *C08L 23/06* (2006.01)
  *C08L 45/00* (2006.01)

(52) U.S. Cl.
  CPC .............. *B32B 27/36* (2013.01); *B65D 65/40* (2013.01); *B65D 81/24* (2013.01); *C08L 23/06* (2013.01); *C08L 45/00* (2013.01); *B32B 2307/7244* (2013.01); *B32B 2307/732* (2013.01); *B32B 2323/046* (2013.01); *B32B 2329/04* (2013.01); *B32B 2553/00* (2013.01); *C08L 2203/162* (2013.01)

(56) References Cited

U.S. PATENT DOCUMENTS

| | | | |
|---|---|---|---|
| 7,414,091 B2 * | 8/2008 | Chen | C08G 18/6254 524/589 |
| 2003/0099851 A1 * | 5/2003 | Mount, III | B32B 27/34 428/458 |
| 2005/0048307 A1 * | 3/2005 | Schubert | B32B 15/08 428/626 |
| 2005/0112337 A1 * | 5/2005 | Jester | B32B 27/08 428/200 |
| 2008/0107899 A1 * | 5/2008 | Lu | C08L 23/0823 428/461 |
| 2009/0110888 A1 * | 4/2009 | Wuest | B32B 27/306 428/200 |
| 2009/0285511 A1 | 11/2009 | Aithani | |
| 2011/0212338 A1 * | 9/2011 | Ambroise | B32B 27/18 428/515 |
| 2011/0268979 A1 | 11/2011 | Ambroise et al. | |
| 2012/0028058 A1 * | 2/2012 | Paolilli | B29C 48/21 428/457 |
| 2014/0065382 A1 * | 3/2014 | Koehn | B32B 27/20 428/220 |
| 2014/0308466 A1 * | 10/2014 | Kashima | C09K 3/10 525/240 |
| 2014/0370278 A1 | 12/2014 | Hausmann et al. | |
| 2015/0125098 A1 * | 5/2015 | Okamoto | B32B 15/08 383/116 |

FOREIGN PATENT DOCUMENTS

| | | | | |
|---|---|---|---|---|
| EP | 2 128 196 A1 | 12/2009 | | |
| JP | H04-276253 A | 10/1992 | | |
| JP | 2000/327756 | * 11/2000 | ............ | C08G 61/08 |
| JP | 2000-327756 A | 11/2000 | | |
| JP | 2003-019773 A | 1/2003 | | |
| JP | 2004-106514 A | 4/2004 | | |
| JP | 2005-335108 A | 12/2005 | | |
| JP | 2007-515511 A | 6/2007 | | |
| JP | 2010/006985 | * 1/2010 | ............ | B32B 27/08 |
| JP | 2010-006985 A | 1/2010 | | |
| JP | 2011-230322 A | 11/2011 | | |
| JP | 2012-236382 A | 12/2012 | | |
| JP | 2015-113124 A | 6/2015 | | |
| JP | 2015-137130 A | 7/2015 | | |
| WO | WO-2005/056634 A1 | 6/2005 | | |
| WO | WO-2005056634 A1 | * 6/2005 | ............ | B32B 27/08 |

OTHER PUBLICATIONS

Shimizu—JP 2010-006985 A—ISR D#26—MT—molding material for packaging—2010 (Year: 2010).*
Bermeshev SelectiveCatalyticHydrogenatio—tricyclo structure—Petro.Chem—2018 (Year: 2018).*
Final Office Action for US Appl. U.S. Appl. No. 16/251,483 dated Mar. 1, 2021 (12 pages).
Hopewell, et al., "Plastics recycling: challenges and opportunities", Phil. Trans. R. Soc. B vol. No. 364 pp. 2115-2126 (2009).
Kostadinova, et al., "Recycling of high density polyethylene containers", Polymer Degradation and Stability, vol. No. 57, pp. 77-81 (1997).
Non-Final Office Action for U.S. Appl. No. 16/251,483 dated Nov. 5, 2020 (15 pages).
Non-Final Office Action for U.S. Appl. No. 16/251,483 dated Sep. 21, 2021 (25 pages).
Japanese Patent Office, "Decision to Grant a Patent," issued in connection with Japanese Patent Application No. 2016-142373, dated Jul. 21, 2017.
Japanese Patent Office, "Notice of Reasons for Revocation," issued in connection with Japanese Patent Application No. 2016-142373, dated May 15, 2018.
Japanese Patent Office, "Decision to Grant a Patent," issued in connection with Japanese Patent Application No. 2016-212818, dated Mar. 23, 2017.
International Searching Authority, "International Search Report," issued in connection with International Patent Application No. PCT/JP2017/025776, dated Sep. 5, 2017.
International Searching Authority, "Written Opinion," issued in connection with International Patent Application No. PCT/JP2017/025776, dated Sep. 5, 2017.
Extended European Search Report dated Jan. 14, 2020 for corresponding Application No. 17830962.1.
Office Action dated Mar. 13, 2020 for corresponding Chinese Patent Application No. 201780044820.2.
Bermeshev et al., "Selective Catalytic Hydrogenation of Alicyclic Dienes with Hydrogen in a Liquid Phase," Petrolium Chemistry, vol. 58, No. 10, 2018, pp. 869-875.
Loultcheva et al., "Recycling of high density polyethylene containers," Polyethylene Degradation and Stability, vol. 57, 1997, pp. 77-81.
Non-Final Office Action for U.S. Appl. No. 16/251,483 dated May 16, 2022 (19 pages).
Final Office Action issued in corresponding U.S. Appl. No. 16/251,483, dated Sep. 15, 2022.
Final Office Action for U.S. Appl. No. 16/251,483 dated Jan. 18, 2022 (20 pages).

* cited by examiner

SEALANT FILM, MULTILAYER FILM INCLUDING SAME AND PACKAGING BAG

CROSS-REFERENCE TO RELATED PATENT APPLICATIONS

The present application is a Continuation of U.S. patent application Ser. No. 16/251,483, filed on Jan. 18, 2019, which is a Bypass Continuation of International Patent Application No. PCT/JP2017/025776, filed on Jul. 14, 2017, which is based upon and claims the benefit of priority to Japanese Patent Application Nos. 2016-142373, filed on Jul. 20, 2016, 2016-212817, filed on Oct. 31, 2016, and 2016-212818, filed on Oct. 31, 2016; the disclosures of which are all incorporated herein by reference in their entireties.

TECHNICAL FIELD

The present invention relates to a sealant film, a multilayer film including the same, and a packaging bag.

BACKGROUND ART

Conventionally, as a packaging container for storing contents such as food, beverage or medicine, for example, a packaging bag composed of a multilayer film formed by stacking a base sheet made of a resin film or paper and a sealant film has been widely used. Furthermore, in order to suppress degradation of contents due to oxygen, decrease of contents due to dissipation thereof to the outside, etc., a gas barrier film may be further stacked or a gas barrier property may be imparted to the base sheet, so that the permeability through the multilayer film is lowered.

On the other hand, contents (in particular, medicinal ingredient, fragrance ingredient, etc.) are adsorbed to or absorbed in a sealant film (in particular, polyolefin film or the like) that is in contact with the contents, unfortunately decreasing the amount of the contents or deteriorating the quality thereof (See, for example, Japanese Patent Laying-Open No. 2015-137130 (PTL 1)).

Japanese Patent Laying-Open No. 2010-6985 (PTL 2) discloses that a hydrogenated product of a ring-opening copolymer containing a structural unit derived from a dicyclopentadiene compound, a structural unit derived from a tetracyclododecene compound, and a structural unit derived from a norbornene compound in a specific ratio is excellent in solution stability during manufacture, and a molding material containing the hydrogenated product as a resin component has high transparency, high moisture resistance and moderate heat resistance.

CITATION LIST

Patent Literature

PTL 1: Japanese Patent Laying-Open No. 2015-137130;
PTL 2: Japanese Patent Laying-Open No. 2010-6985

SUMMARY OF INVENTION

Technical Problem

In order to suppress adsorption or absorption of contents by a sealant film, as the material of the sealant film, using a material has been studied having so low adsorption property that contents such as medicinal ingredient or fragrance ingredient are hardly adsorbed or absorbed, such as EVOH (ethylene-vinyl alcohol copolymer resin), PET (polyethylene terephthalate) resin, polyacrylonitrile (PAN). However, such materials may suffer from inferior low-temperature sealing property or insufficient seal strength.

The present invention has been made in view of above problems, and has an object to provide a sealant film that is improved or even excellent in low adsorption property and has sufficient low-temperature sealing property and seal strength.

Solution to Problem

[1]
A sealant film including:
a polyolefin layer containing polyolefin as a main ingredient; and
a polycycloolefin layer as an outermost layer containing polycycloolefin as a main ingredient,
wherein the polycycloolefin contains two or more kinds of structural units selected from a structural unit (A) derived from a dicyclopentadiene compound, a structural unit (B) derived from a tetracyclododecene compound, and a structural unit (C) derived from a norbornene compound, and
the polycycloolefin has a glass transition temperature less than or equal to 80° C.

[2]
The sealant film according to [1], wherein the polycycloolefin contains the structural unit (A) derived from a dicyclopentadiene compound, the structural unit (B) derived from a tetracyclododecene compound and the structural unit (C) derived from a norbornene compound.

[3]
The sealant film according to [1] or [2], wherein the polycycloolefin has a glass transition temperature greater than or equal to 40° C.

[4]
The sealant film according to any one of [1] to [3], wherein the dicyclopentadiene compound is tricyclo $[5.2.1.0^{2,6}]$ deca-3,8-diene (synonymous with dicyclopentadiene) or a derivative of tricyclo $[5.2.1.0^{2,6}]$ deca-3,8-diene, the tetracyclododecene compound is tetracyclo $[4.4.0.1^{2,5}.1^{7,10}]$-3-dodecene or a derivative of tetracyclo $[4.4.0.1^{2,5}.1^{7,10}]$-3-dodecene, and the norbornene compound is bicyclo [2.2.1] hept-2-ene or a derivative of bicyclo [2.2.1] hept-2-ene.

[5]
The sealant film according to any one of [1] to [4], wherein the polycycloolefin is a ring-opening metathesis polymer of two or more kinds of compounds selected from the dicyclopentadiene compound, the tetracyclododecene compound and the norbornene compound, and carbon-carbon double bonds are hydrogenated.

[6]
A multilayer film including:
a base sheet; and
the sealant film according to any one of [1] to [5],
the sealant film being stacked on the base sheet.

[7]
The multilayer film according to [6] further including a gas barrier film stacked between the base sheet and the sealant film.

[8]
The multilayer film according to [6] or [7] having a thickness less than or equal to 100

[9]
A packaging bag including the multilayer film according to any one of [6] to [8] sealed such that the sealant films are fused to each other.

[10]
A sealant film including:
a polyolefin layer containing polyolefin; and
a polycycloolefin layer as an outermost layer containing polycycloolefin as a main ingredient,
wherein the polycycloolefin contains two or more kinds of structural units selected from a structural unit (A) derived from a dicyclopentadiene compound, a structural unit (B) derived from a tetracyclododecene compound, and a structural unit (C) derived from a norbornene compound,
the polycycloolefin has a glass transition temperature less than or equal to 80° C.,
the polyolefin layer has a thickness greater than or equal to 10 µm and less than or equal to 40 µm, and
the polycycloolefin layer has a thickness greater than or equal to 5 µm and less than or equal to 20 µm.

[11]
The sealant film according to [10], wherein the polyolefin layer contains less than or equal to 50% by mass polycycloolefin relative to the mass of the sealant film.

[12]
A sealant film including:
a polyolefin layer containing polyolefin; and
a polycycloolefin layer as an outermost layer containing polycycloolefin as a main ingredient,
wherein the polycycloolefin contains two or more kinds of structural units selected from a structural unit (A) derived from a dicyclopentadiene compound, a structural unit (B) derived from a tetracyclododecene compound, and a structural unit (C) derived from a norbornene compound,
the polycycloolefin has a glass transition temperature less than or equal to 80° C.,
the polycycloolefin layer has a thickness (T2) greater than or equal to 5 µm and less than or equal to 10 µm, and
the ratio (a) of the thickness (T1) of the polyolefin layer to thickness (T2) of the polycycloolefin layer is greater than or equal to 3 and less than or equal to 9.

Advantageous Effects of Invention

According to the present invention, it is possible to provide a sealant film that is improved or even excellent in low adsorption property and has sufficient low-temperature sealing property and seal strength.

DESCRIPTION OF REPRESENTATIVE EMBODIMENTS

Figure 1:
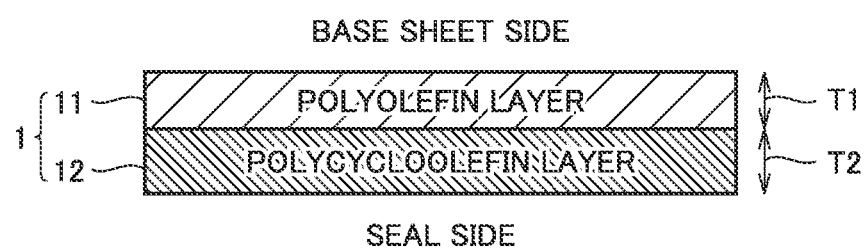
FIG. 1 is a schematic cross-sectional view showing a sealant film of embodiments 1, 2-1 and 3-1.

Hereinafter, a description is made of embodiments of the present invention with reference to the drawings. The present invention is not limited to the following representative embodiments, and appropriate modifications can be made without departing from the spirit of the present invention. The representative embodiments described below are merely examples of the present invention, and the design thereof could be appropriately changed by one skilled in the art. The same constituent elements are denoted by the same reference numerals unless there is a reason for the sake of convenience, and redundant description is omitted. In the drawings referred to in the following description, for clarity, characteristic parts are enlarged, and thus the components are not shown to scale.

<Sealant Film I>

Embodiment 1

Referring to FIG. 1, a sealant film 1 of this embodiment is a sealant film made of two layers of a polyolefin layer 11 (on the base sheet side) and a polycycloolefin layer 12 (on the seal side).

(Polyolefin Layer: On Base Sheet Side)

Polyolefin layer 11 contains polyolefin as a main ingredient. The phrase "contains as a main ingredient" means, for example, that the content amount of polyolefin is greater than 50% by mass relative to the total amount of polyolefin layer 11, and the content amount of polyolefin is preferably greater than or equal to 80% by mass, more preferably greater than or equal to 90% by mass (the same hereinafter).

As the polyolefin, polyethylene can be suitably used. As the polyethylene, for example, a low density polyethylene (LDPE) or linear low density polyethylene (LLDPE) can be suitably used.

(Polycycloolefin Layer: On Seal Side)

Polycycloolefin layer 12 contains polycycloolefin as a main ingredient. Other polymer materials, various additives or the like as disclosed in PTL 2 may be blended.

The polycycloolefin contains structural units derived from two or more kinds of compounds (cycloolefin monomers) selected from a dicyclopentadiene compound, a tetracyclododecene compound and a norbornene compound. In other words, the polycycloolefin contains two or more kinds of structural units selected from a structural unit (A) derived from a dicyclopentadiene compound, a structural unit (B) derived from a tetracyclododecene compound, and a structural unit (C) derived from a norbornene compound.

Preferably, the polycycloolefin contains the structural unit (A) derived from a dicyclopentadiene compound, the structural unit (B) derived from a tetracyclododecene compound and the structural unit (C) derived from a norbornene compound.

When the polycycloolefin contains structural units (A), (B) and (C), the ratio of structural unit (A) derived from a dicyclopentadiene compound is preferably 5 to 80 mol %. The ratio of structural unit (B) derived from a tetracyclododecene compound is preferably 10 to 90 mol %. The ratio of structural unit (C) derived from a norbornene compound is preferably 5 to 50 mol %. These ratios are ratios when the total of structural units (A), (B) and (C) is 100 mol %. Even in this case, the polycycloolefin may contain a structural unit other than structural units (A), (B) and (C) within a range in which the effect of the present invention is not impaired.

Examples of the dicyclopentadiene compound include dicyclopentadiene (tricyclo [5.2.1.0$^{2,6}$] deca-3,8-diene) and derivatives thereof. Examples of the derivatives of dicyclopentadiene include 2-methyl dicyclopentadiene, 2,3-dimethyl dicyclopentadiene and 2,3-dihydroxydicyclopentadiene.

Examples of structural unit (A) derived from a dicyclopentadiene compound include a structural unit derived from dicyclopentadiene.

Examples of the tetracyclododecene compound include tetracyclo [4.4.0.1$^{2,5}$.1$^{7,10}$]-3-dodecene and derivatives thereof. Examples of the derivatives of tetracyclo [4.4.0.1$^{2,5}$.1$^{7,10}$]-3-dodecene include 8-methyltetracyclo [4.4.0.1$^{2,5}$.1$^{7,10}$]-3-dodecene, 8-ethyltetracyclo [4.4.0.1$^{2,5}$.1$^{7,10}$]-3-dodecene, 8-ethylidenetetracyclo [4.4.0.1$^{2,5}$.1$^{7,10}$]-3-dodecene, 8,9-dimethyltetracyclo [4.4.0.1$^{2,5}$.1$^{7,10}$]-3-dodecene, 8-ethyl-9-methyltetracyclo [4.4.0.1$^{2,5}$.1$^{7,10}$]-3-dodecene, 8-ethylidene-9-methyltetracyclo [4.4.0.1$^{2,5}$.1$^{7,10}$]-3-dodecene and 8-methyl-8-carboxymethyltetracyclo [4.4.0.1$^{2,5}$.1$^{7,10}$]-3-dodecene.

Examples of structural unit (B) derived from a tetracyclododecene compound include a structural unit derived from tetracyclo [4.4.0.1$^{2,5}$.1$^{7,10}$]-3-dodecene.

Examples of the norbornene compound include bicyclo [2.2.1] hept-2-ene (trivial name: norbornene) and derivatives thereof. Examples of the derivatives of bicyclo [2.2.1] hept-2-ene include 5-methyl-bicyclo [2.2.1] hept-2-ene, 5,5-dimethyl-bicyclo [2.2.1] hept-2-ene, 5-ethyl-bicyclo [2.2.1] hept-2-ene, 5-ethylidene-bicyclo [2.2.1] hept-2-ene, 5-vinyl-bicyclo [2.2.1] hept-2-ene, 5-propenylbicyclo [2.2.1] hept-2-ene, 5-methoxycarbonyl-bicyclo [2.2.1] hept-2-ene, 5-cyanobicyclo [2.2.1] hept-2-ene and 5-methyl-5 methoxycarbonyl-bicyclo [2.2.1] hept-2-ene.

Examples of structural unit (C) derived from a norbornene compound include a structural unit derived from bicyclo [2.2.1] hept-2-ene.

The polycycloolefin is preferably obtained by ring-opening metathesis copolymerization of the cycloolefin monomer, followed by hydrogenation of C—C double bonds. Such production of the polycycloolefin can be carried out according to PTL 2.

The glass transition temperature (Tg) of the polycycloolefin is less than or equal to 80° C., preferably less than or equal to 75° C. In this case, a sealant film can be obtained having, in addition to non-adsorption property, appropriate seal strength and low-temperature sealing property. Tg can be measured based on JIS K 7121.

When the Tg of the polycycloolefin is equal to the room temperature, the sealant film may melt. Accordingly, the Tg of the polycycloolefin is preferably higher than or equal to 40° C., more preferably higher than or equal to 50° C.

Sealant film 1 can be produced as a film having a two-layer structure, for example, by two-layer co-extrusion of the polyolefin layer (film-shaped semi-molded product) and the polycycloolefin layer (film-shaped semi-molded product). The thickness of sealant film 1 is preferably less than or equal to 100 µm. In addition, the thickness of sealant film 1 is preferably greater than or equal to 10 µm.

Sealant film 1 of this embodiment is provided with a layer composed of the polycycloolefin containing structural units derived from specific two or more kinds of the cycloolefin monomers as described above, with the result that it has non-adsorption property such that adsorption or absorption of contents (medicinal ingredient, fragrance ingredient, etc.) is suppressed, and also has sufficient seal strength and low-temperature sealing property.

Polyolefin layer 11 constituting sealant film 1 plays a role of making the film flexible. When the polycycloolefin layer made of a ring-opening metathesis polymer of two or more kinds of compounds selected from a dicyclopentadiene compound, tetracyclododecene compound and norbornene compound is a single layer, the film is hard, and has difficulty in corona treatment or film formation, making it very difficult to manufacture the polycycloolefin layer as a packaging bag. In response, using polyolefin layer 11 adjacent to polycycloolefin layer 12 to improve the processability and film forming suitability makes it possible to manufacture polyolefin layer 11 and polycycloolefin layer 12 as a packaging bag.

Regarding the low-temperature sealing property, specifically, for example, the rising temperature of seal strength (index of the minimum sealable temperature) of the sealant film is preferably less than or equal to 120° C. The rising temperature of seal strength is measured according to JIS Z 0238 focusing on temperature.

Regarding the seal strength, specifically, the seal strength of the sealant film is preferably greater than or equal to 5.0 N/15 mm under a sealing condition of 140° C., 0.2 MPa, 1.0 second. The seal strength is measured according to JIS Z 0238.

In addition, the sealant film of this embodiment is also improved or even excellent in moisture resistance. Regarding the moisture resistance, specifically, the water vapor permeability through the multilayer film having a thickness of less than or equal to 50 µm obtained by laminating the sealant film and a non-barrier base sheet is preferably less than or equal to 5.0 g/(m$^2$·24 h). The moisture permeability (water vapor permeability) is measured under a condition of 40° C., 90% RH based on JIS K 7129 A.

Embodiment 2

Figure 2:
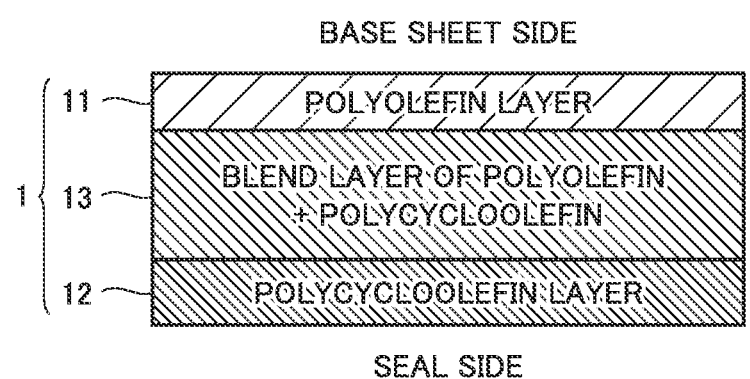
FIG. 2 is a schematic cross-sectional view showing a sealant film of embodiment 2.

Referring to FIG. 2, the sealant film of this embodiment is the same as that of embodiment 1, except that a blend layer 13 made of a blend resin of polyolefin and polycycloolefin is provided between polyolefin layer 11 and polycycloolefin layer 12.

It is preferable that blend layer 13 be obtained by recycling a polycycloolefin material derived when both ends of elongated polycycloolefin layer 12 are cut by trimming during production, etc. In other words, blend layer 13 is preferably composed of a blend resin of recycled polycycloolefin and polyolefin.

The same effect can be obtained by providing such blend layer 13, even when the thickness of polycycloolefin layer 12 is made thinner as compared to a case where there is no blend layer 13. Accordingly, the raw material cost of polycycloolefin that is a relatively expensive material can be reduced.

<Multilayer Film I>

Embodiment 3

Figure 3:
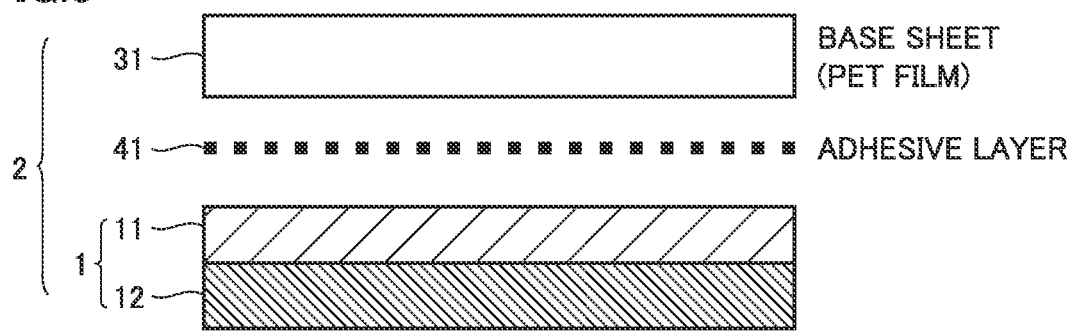
FIG. 3 is a schematic cross-sectional view showing a multilayer film of embodiments 3, 2-2 and 3-2.

Referring to FIG. 3, a multilayer film 2 (packaging material) of this embodiment is a multilayer film obtained by stacking sealant film 1 of embodiment 1, an adhesive layer 41 and a base sheet 31 in this order.

As base sheet 31, the constituent material is not particularly limited, but plastic film, paper, nonwoven fabric or the like can be used, as long as it has mechanical strength and dimensional stability. Examples of the constituent material of the plastic film include polyester such as polyethylene terephthalate (PET) or polyethylene naphthalate, polyolefin such as polypropylene, polystyrene, polyamide such as 6-nylon, polycarbonate, polyacrylonitrile, and polyimide. The plastic film is preferably a biaxially stretched film. In this embodiment, base sheet 31 is a PET film.

As an adhesive constituting adhesive layer 41, the constituent material is not particularly limited, but an adhesive for dry lamination can be suitably used. Examples of the adhesive for dry lamination include a two-component curing type urethane adhesive, polyester-urethane adhesive, polyether-urethane adhesive, acrylic adhesive, polyester adhesive, polyamide adhesive and epoxy adhesive. A method for laminating sealant film 1 and a gas barrier film 6 using such an adhesive includes a dry lamination method.

Among the above-mentioned adhesives, a two-component curing type adhesive that is improved or even excellent in adhesive strength and hardly reduces the adhesive strength due to a chemical ingredient from contents can be suitably used. The two-component curing type adhesive is made of a main agent and a curing agent, and examples thereof include a two-component curing type adhesive made of polyester polyol and polyfunctional polyisocyanate.

In place of the above-mentioned adhesive layer, an anchor coating agent (two-component curing type urethane adhesive, polyallylamine, etc.) or the like may be used.

The multilayer film of this embodiment is provided with the sealant film of embodiment 1, with the result that it has non-adsorption property such that adsorption or absorption of contents (medicinal ingredient, fragrance ingredient, etc.) is suppressed, and also has sufficient seal strength and low-temperature sealing property, similar to embodiment 1, as well as is improved or even excellent in moisture resistance. Also in following embodiments 4 to 10, the same effect is achieved by providing the sealant film of embodiment 1.

Embodiment 4

Figure 4:
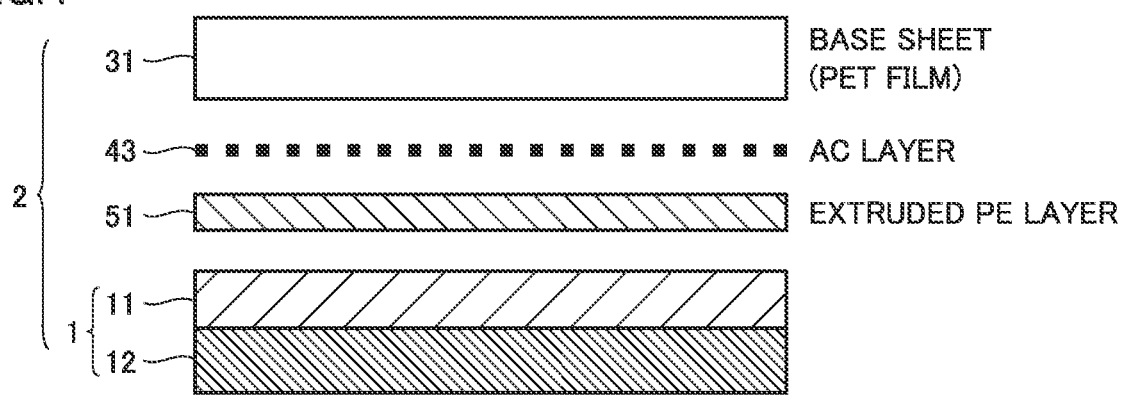
FIG. 4 is a schematic cross-sectional view showing a multilayer film of embodiment 4.

Referring to FIG. 4, multilayer film 2 of this embodiment is a multilayer film obtained by stacking sealant film 1 of embodiment 1, an extruded PE layer 51, an anchor coat layer 43 and base sheet 31 (PET film) in this order.

Anchor coat layer 43 can be formed by applying an anchor coating agent (two-component curing type urethane adhesive, polyallylamine, etc.) to one surface of base sheet 31, and then multilayer film 2 can be produced by melting PE and co-extruding the same with base sheet 31 and sealant film 1.

Embodiment 5

Figure 5:
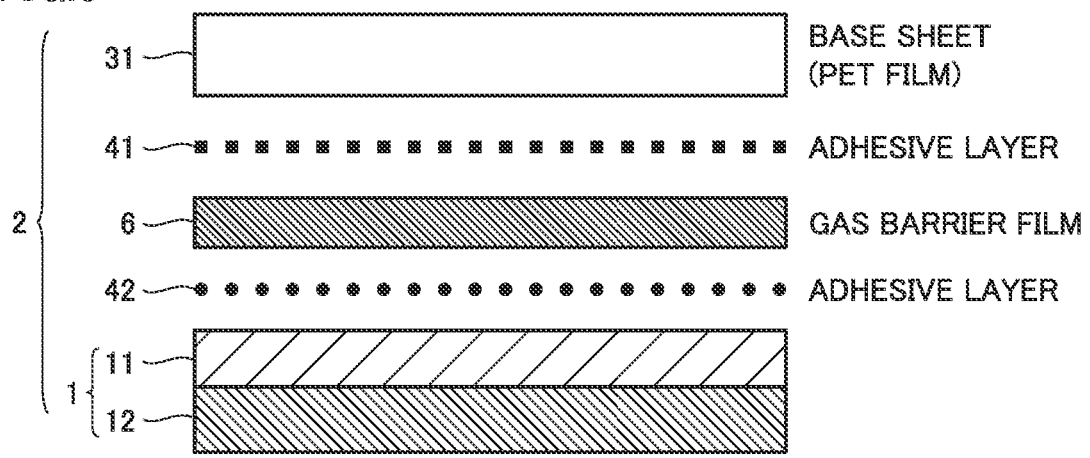
FIG. 5 is a schematic cross-sectional view showing a multilayer film of embodiments 5, 2-3 and 3-3.

Referring to FIG. 5, the multilayer film of this embodiment is the same as that of embodiment 3, except that gas barrier film 6 is stacked in the middle in order to suppress degradation of contents due to oxygen gas, decrease of contents due to dissipation thereof to the outside, etc. Note that it has an adhesive layer 42 for adhering gas barrier film 6 such as an aluminum foil to sealant film 1.

Examples of gas barrier film 6 include an aluminum foil. In addition, a film having an aluminum vapor deposition film, film having an inorganic oxide vapor deposition film etc. can be used. Specifically, for example, those having an aluminum vapor deposition film or inorganic oxide vapor deposition film formed on a stretched film such as a polyester film, polypropylene film or nylon film can be used. Furthermore, as gas barrier film 6, a film of an ethylene vinyl alcohol copolymer can also be used.

As an adhesive constituting adhesive layer 42, the same material as that for adhesive layer 41 can be used. The adhesive constituting adhesive layer 41 and the adhesive constituting adhesive layer 42 may have the same ingredient or different ingredients.

Embodiment 6

Figure 6:
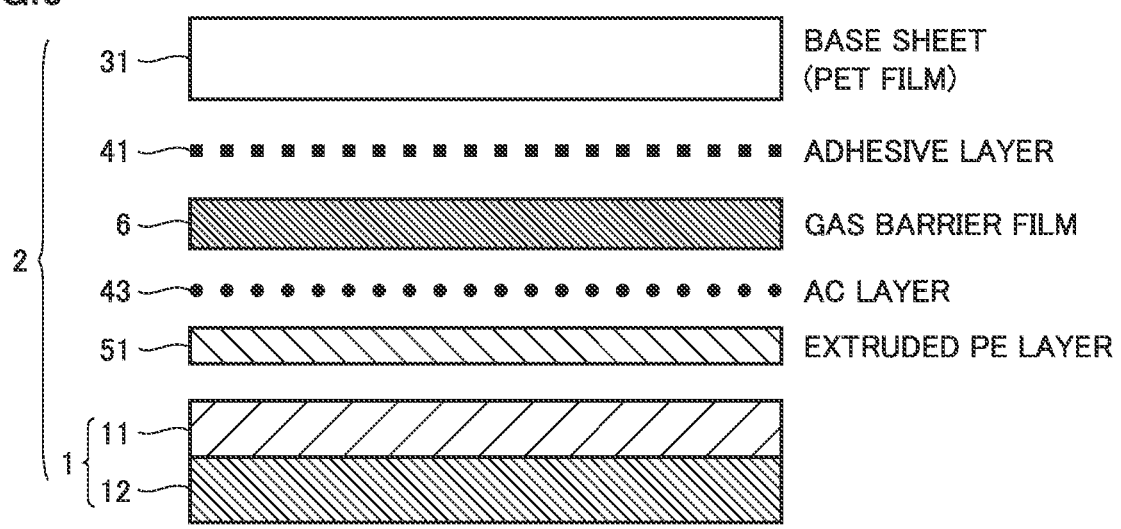
FIG. 6 is a schematic cross-sectional view showing a multilayer film of embodiment 6.

Referring to FIG. 6, the multilayer film of this embodiment is the same as that of embodiment 5, except that, in place of adhesive layer 42, extruded PE layer 51 and anchor coat layer 43 are stacked.

Embodiment 7

Figure 7:
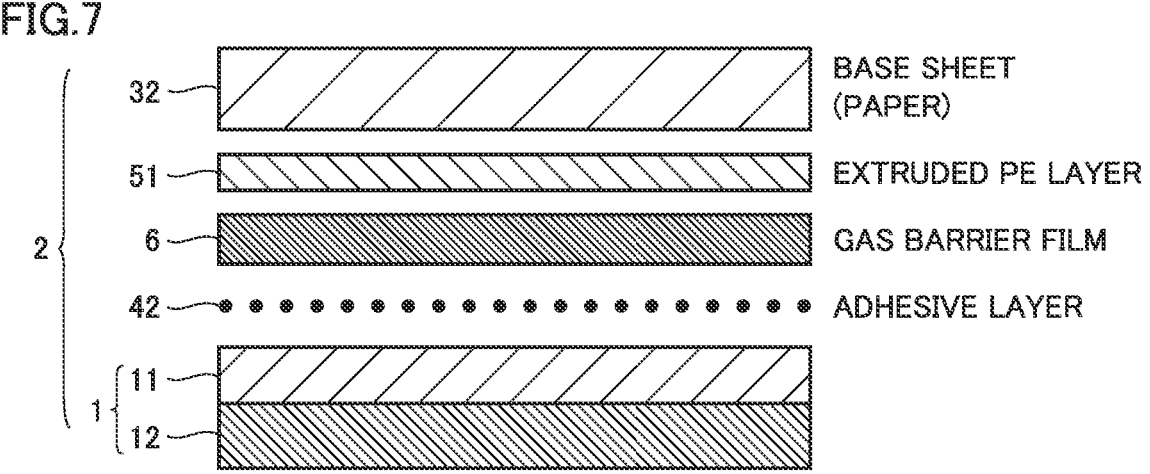
FIG. 7 is a schematic cross-sectional view showing a multilayer film of embodiment 7.

Referring to FIG. 7, the multilayer film of this embodiment is the same as that of embodiment 5, except that, in place of adhesive layer 41, extruded PE layer 51 is stacked.

Embodiment 8

Figure 8:
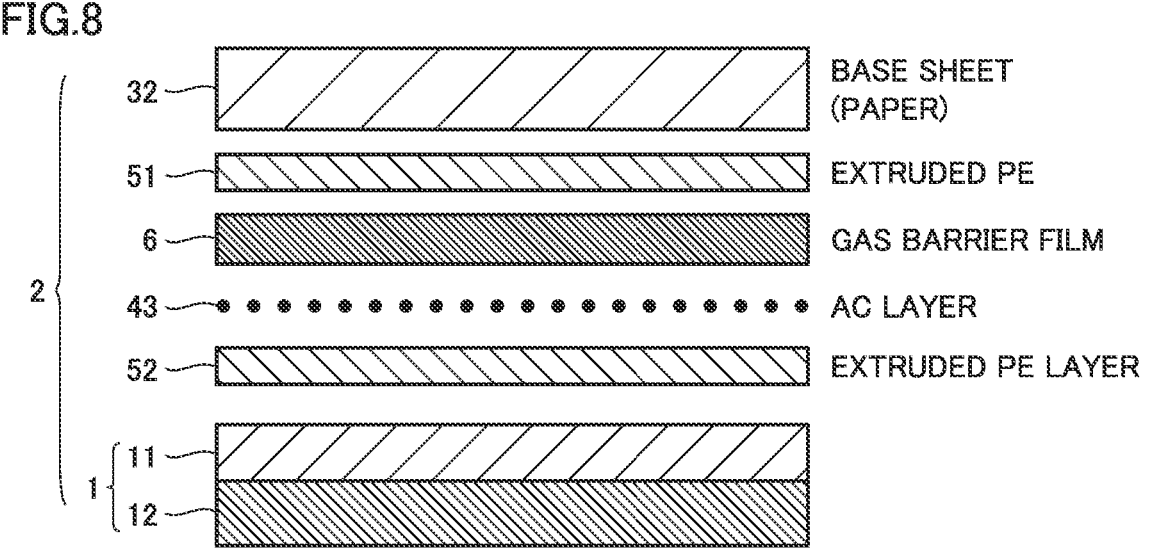
FIG. 8 is a schematic cross-sectional view showing a multilayer film of embodiment 8.

Referring to FIG. 8, the multilayer film of this embodiment is the same as that of embodiment 5, except that, in place of adhesive layer 41, extruded PE layer 51 is stacked, and in place of adhesive layer 42, extruded PE layer 52 and anchor coat layer 43 are stacked.

Embodiment 9

Figure 9:
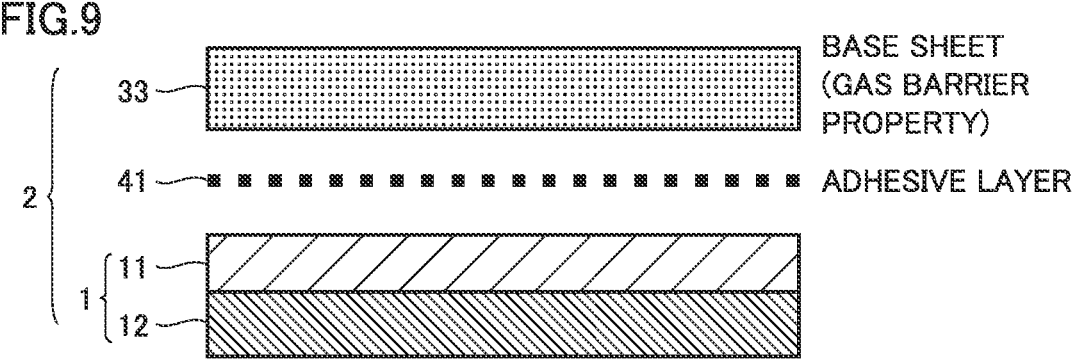
FIG. 9 is a schematic cross-sectional view showing a multilayer film of embodiment 9.

Referring to FIG. 9, the multilayer film of this embodiment is the same as that of embodiment 3, except that a base sheet 33 has gas barrier property. In this embodiment, base sheet 33 is a PE resin film having gas barrier property.

Embodiment 10

Figure 10:
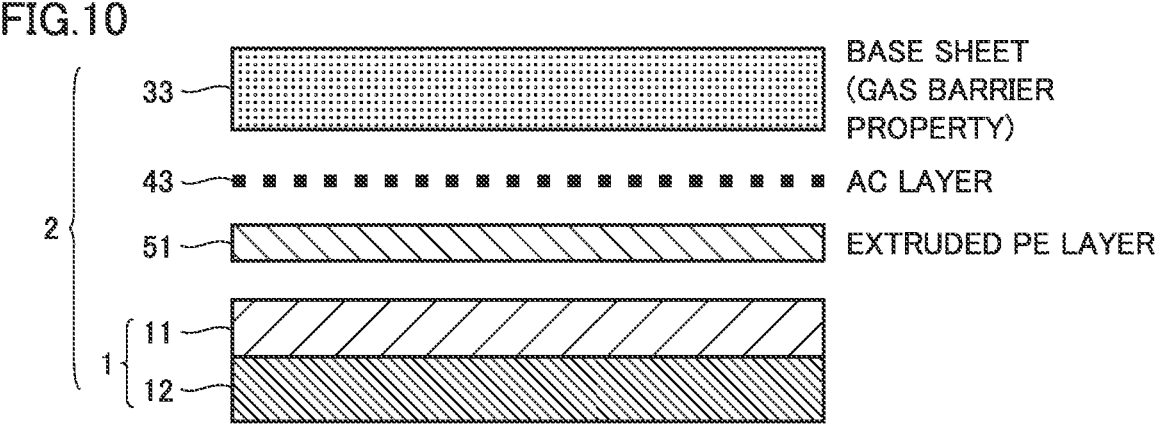
FIG. 10 is a schematic cross-sectional view showing a multilayer film of embodiment 10.

Referring to FIG. 10, the multilayer film of this embodiment is the same as that of embodiment 9, except that, in place of adhesive layer 41, extruded PE layer 51 and anchor coat layer 43 are stacked.

<Packing Bag I>

The multilayer film formed as described above is used to form a packaging bag having a desired shape. For example, a pillow type packaging bag, gusset type packaging bag, self-standing type packaging bag etc. (see PTL 1) may be produced depending on the purpose (design of the packaging bag, amount of contents, ease of use etc.). In such a packaging bag, at least two of the above-mentioned multilayer films are sealed at least in part such that the sealant films are fused to each other.

Examples of contents include medicine, quasi-drug, food or beverage. The packaging bag of this embodiment can be particularly suitably used for a content containing medicinal ingredient, aroma ingredient etc. (an ingredient that is easily adsorbed to or absorbed in a packaging bag or an ingredient that causes a problem when it is adsorbed to or absorbed in a packaging bag). Specifically, the packaging bag of this embodiment can be suitably used for accommodating, for example, a percutaneous absorption agent or mouthwash containing a medicinal ingredient, a cosmetic product containing an aromatic ingredient such as perfume, or coffee.

Hereinafter, a more detailed description is made of the present invention with reference to examples, but the present invention is not limited thereto.

Example 1

Similar to embodiment 3, a base sheet and the sealant film of embodiment 1 were stacked with a two-component curing type polyester and a polyurethane adhesive interposed therebetween to produce a multilayer film.

The thickness of the base sheet (PET) is 12 μm, and the thickness of the sealant film is 30 μm. The thickness of an adhesive layer is negligible.

The sealant film is made of a polyolefin layer and a polycycloolefin layer. The thickness of the polyolefin layer is 10 μm, and the thickness of the polycycloolefin layer is 20 μm.

The base sheet is made of polyethylene terephthalate (PET). The polyolefin layer is made of linear low density polyethylene (LLDPE). The polycycloolefin layer is made of following polycycloolefin A.

Polycycloolefin A: that is a ternary copolymer of three kinds of cycloolefin monomers made of tricyclo $[5.2.1.0^{2,6}]$ deca-3,8-diene, tetracyclo $[4.4.0.1^{2,5}.1^{7,10}]$-3-dodecene, and bicyclo $[2.2.1]$ hept-2-ene.

Example 2

A multilayer film was prepared in the same manner as in Example 1, except that the thickness of the polyolefin layer was 15 μm and the thickness of the polycycloolefin layer was 15 μm in the sealant film.

Example 3

A multilayer film was prepared in the same manner as in Example 1, except that the thickness of the polyolefin layer was 20 μm and the thickness of the polycycloolefin layer was 10 μm in the sealant film.

Example 4

A multilayer film was produced in the same manner as in Example 1, except that it was a three layered film obtained by stacking the polyolefin layer constituting the sealant film, a blend layer (a layer containing as a main ingredient a blend resin of polyolefin and polycycloolefin) and the polycycloolefin layer in this order. The thickness of the polyolefin layer, the thickness of the blend layer and the thickness of the polycycloolefin layer are all 10 μm.

Example 5

A multilayer film was produced in the same manner as in Example 1, except that following polycycloolefin B was used as a polycycloolefin constituting the polycycloolefin layer of the sealant film.

Polycycloolefin B: that is a ternary copolymer of three kinds of cycloolefin monomers made of 2-methyl dicyclopentadiene, 8-methyltetracyclo $[4.4.0.1^{2,5}.1^{7,10}]$-3-dodecene, and 5-methyl-bicyclo $[2.2.1]$ hept-2-ene.

Example 6

A multilayer film was produced in the same manner as in Example 1, except that following polycycloolefin C was used as a polycycloolefin constituting the polycycloolefin layer of the sealant film.

Polycycloolefin C: that is a ternary copolymer of three kinds of cycloolefin monomers made of 2,3-dimethyldicyclopentadiene, 8-ethyltetracyclo $[4.4.0.1^{2,5}.1^{7,10}]$-3-dodecene, and 5,5-dimethyl-bicyclo $[2.2.1]$ hept-2-ene.

Example 7

A multilayer film was produced in the same manner as in Example 1, except that following polycycloolefin D was used as a polycycloolefin constituting the polycycloolefin layer of the sealant film.

Polycycloolefin D: that is a ternary copolymer of three kinds of cycloolefin monomers made of 2,3-dihydroxy dicyclopentadiene, 8-ethylidenetetracyclo $[4.4.0.1^{2,5}.1^{7,10}]$-3-dodecene, and 5-ethyl-bicyclo $[2.2.1]$ hept-2-ene.

Comparative Example 1

A multilayer film was produced in the same manner as in Example 1, except that following polycycloolefin E was used as a polycycloolefin constituting the polycycloolefin layer of the sealant film.

Polycycloolefin E: that is a binary copolymer of two kinds of cycloolefin monomers made of dicyclopentadiene, and tetracyclododecene (tetracyclo $[6.2.1.1^{3,6}.0^{2,7}]$ dodeca-4-ene).

Comparative Example 2

A multilayer film was produced in the same manner as in Example 1, except that following polycycloolefin F was used as a polycycloolefin constituting the polycycloolefin layer of the sealant film.

Polycycloolefin F: that is a binary copolymer of two kinds of cycloolefin monomers made of 2-methyl dicyclopentadiene, and 8-methyltetracyclo $[4.4.0.1^{2,5}.1^{7,10}]$-3-dodecene.

Comparative Example 3

A multilayer film was produced in the same manner as in Example 1, except that the sealant film was a monolayer film made of a PET compound (PET 1: PET-G: made by Tamapoly Co., Ltd.).

Comparative Example 4

A multilayer film was produced in the same manner as in Example 1, except that the sealant film was a monolayer film made of a PET compound (PET 2: made by Teijin Ltd.).

Comparative Example 5

A multilayer film was produced in the same manner as in Example 1, except that the sealant film was a monolayer film made of a PET compound (PET 3: made by Toyobo Co., Ltd.).

Comparative Example 6

A multilayer film was produced in the same manner as in Example 1, except that the sealant film was a monolayer film made of EVOH (the ratio of a structural unit of ethylene: 47 mol %).

Comparative Example 7

A multilayer film was produced in the same manner as in Example 1, except that the sealant film was a monolayer film made of PAN (made by Tamapoly Co., Ltd.).

<Evaluation Test 1>

As an evaluation test 1, the non-adsorption property was evaluated.

Specifically, the multilayer films of Examples 1 to 7 and Comparative Examples 1 to 7 cut into a predetermined shape were individually placed on a bag making machine in a state where two multilayer films were stacked such that the sealant films were in contact with each other, and then the predetermined areas were sealed to prepare a three-way sealed type packaging bag. At this point in time, in order to fill the packaging bag with a content, the upper end (top seal portion) of the packaging bag had not yet been sealed.

Next, through the upper end of the packaging bag, the packaging bag was filled with any one of tulobuterol (277 mg/m$^2$), l-menthol (2543 mg/m$^2$), methyl salicylate (2801 mg/m$^2$) and DL-camphor (552 mg/m$^2$) under a nitrogen atmosphere, and then the upper end (top seal portion) of the packaging bag was sealed to seal the content. Note that each of these ingredients is an ingredient that is generally easily adsorbed to a sealant film.

The packaging bag accommodating the content as described above was stored in a thermostatic chamber maintained at 40° C. for 1, 3 or 6 months. After storage, the packaging bag was opened, each ingredient was extracted by ethanol extract only from inside the sealant films, and the amount of each extracted ingredient was measured using a high performance liquid chromatography. Based on the measured values, a ratio of the residual amount after each storage period to the initial amount was calculated as the residual ratio of drug (%). The measurement results of the residual ratio of drug are shown in Table 1.

<Evaluation Test 2>

As an evaluation test 2, the seal strength was evaluated.

Specifically, the multilayer films of Examples 1 to 7 and Comparative Examples 1 to 7 were individually sealed with the sealant films facing inwardly. For the sealing condition, the sealing temperature was 140° C., the sealing pressure was 0.2 MPa, and the sealing time was 1.0 second. The peel strength (N/15 mm) of two sealed multilayer films was measured for the strip-shaped cut multilayer films based on JIS Z 0238. The measurement results of the peel strength (seal strength) are shown in Table 1.

<Evaluation Test 3>

As an evaluation test 3, the low-temperature sealing property was evaluated.

Specifically, the multilayer films of Examples 1 to 7 and Comparative Examples 1 to 7 were individually sealed in the same manner as in evaluation test 2, under a sealing condition where the sealing pressure was 0.2 MPa, the sealing time was 1.0 second and the sealing temperature was varied. Then, a temperature where the seal strength started to increase was determined as the seal rising temperature based on JIS Z 0238.

<Evaluation Test 4>

As an evaluation test 4, the moisture resistance was evaluated.

Specifically, for each of the multilayer films of Examples 1 to 7 and Comparative Examples 1 to 7, the moisture permeability was measured using a water vapor permeability tester (L80-5000 model made by LYSSY) under a condition where the temperature was 40° C. and the humidity was 90% RH based on JIS K 7129 (Method A). The measurement results of the moisture permeability are shown in Table 1. The lower the moisture permeability value, the lower the water vapor permeability and the higher the moisture resistance.

The results of evaluation tests 1 to 4 are shown in Table 1. For each of the sealant films used in Examples 1 to 7 and Comparative Examples 1 to 7 (polycycloolefin layers for Examples 1 to 7), the glass transition temperatures (Tg) measured based on JIS K 7121 using a differential scanning calorimeter are shown together in Table 1.

TABLE 1

| | Sealant film | Storage period (Month) | Residual ratio of drug (%) | | | | Tg (° C.) | Seal strength (N/15 mm) | Seal rising temperature (° C.) | Moisture permeability |
|---|---|---|---|---|---|---|---|---|---|---|
| | | | Tulobuterol | l-menthol | Methyl salicylate | DL-camphor | | | | |
| Example 1 | LLDPE: 10 μm/ polycycloolefin A: 20 μm | Initial | 100 | 100 | 100 | 100 | 70 | 15 | 110 | 2.7 |
| | | 1 | 99.66 | 99.66 | 94.39 | 99.72 | | | | |
| | | 3 | 99.69 | 99.85 | 93.16 | 99.88 | | | | |
| | | 6 | 99.58 | 99.56 | 91.22 | 99.67 | | | | |
| Example 2 | LLDPE: 15 μm/ polycycloolefin A: 15 μm | Initial | 100 | 100 | 100 | 100 | | 17 | 110 | 3.6 |
| | | 1 | 99.48 | 99.83 | 94.40 | 99.86 | | | | |
| | | 3 | 99.26 | 99.37 | 91.85 | 99.45 | | | | |
| | | 6 | 99.18 | 99.06 | 88.73 | 99.28 | | | | |
| Example 3 | LLDPE: 20 μm/ polycycloolefin A: 10 μm | Initial | 100 | 100 | 100 | 100 | | 20 | 105 | 4.1 |
| | | 1 | 99.43 | 99.76 | 91.63 | 99.79 | | | | |
| | | 3 | 98.88 | 98.10 | 80.57 | 95.36 | | | | |
| | | 6 | 98.22 | 97.68 | 77.38 | 94.72 | | | | |
| Example 4 | LLDPE: 10 μm/ LLDPE + polycycloolefin A: 10 μm/ polycycloolefin A: 10 μm | Initial | 100 | 100 | 100 | 100 | | 20 | 105 | 4.3 |
| | | 1 | 99.44 | 99.80 | 91.65 | 99.85 | | | | |
| | | 3 | 98.91 | 98.21 | 80.63 | 95.40 | | | | |
| | | 6 | 98.32 | 97.70 | 77.45 | 94.73 | | | | |
| Example 5 | LLDPE: 10 μm/ polycycloolefin B: 20 μm | Initial | 100 | 100 | 100 | 100 | 56 | 15 | 105 | 4.5 |
| | | 1 | 99.67 | 98.66 | 94.42 | 99.73 | | | | |
| | | 3 | 99.64 | 99.88 | 93.11 | 99.60 | | | | |
| | | 6 | 99.55 | 99.55 | 91.13 | 99.62 | | | | |
| Example 6 | LLDPE: 10 μm/ polycycloolefin C: 20 μm | Initial | 100 | 100 | 100 | 100 | 80 | 10 | 115 | 2.5 |
| | | 1 | 99.73 | 99.79 | 94.75 | 99.73 | | | | |
| | | 3 | 99.69 | 99.68 | 93.48 | 99.73 | | | | |
| | | 6 | 99.63 | 99.56 | 91.37 | 99.69 | | | | |

TABLE 1-continued

| | Sealant film | Storage period (Month) | Residual ratio of drug (%) | | | | Tg (° C.) | Seal strength (N/15 mm) | Seal rising temperature (° C.) | Moisture permeability |
| --- | --- | --- | --- | --- | --- | --- | --- | --- | --- | --- |
| | | | Tulobuterol | l-menthol | Methyl salicylate | DL-camphor | | | | |
| Example 7 | LLDPE: 10 μm/ polycycloolefin D: 20 μm | Initial 1 3 6 | 100 99.65 99.68 99.60 | 100 99.83 99.86 99.54 | 100 94.32 93.10 91.29 | 100 99.70 99.68 99.65 | 50 | 15 | 104 | 4.8 |
| Comparative Example 1 | LLDPE: 10 μm/ polycycloolefin E: 20 μm | Initial 1 3 6 | 100 99.77 99.65 99.57 | 100 99.80 99.83 99.74 | 100 95.22 94.16 93.00 | 100 99.82 99.89 99.86 | 115 | 0 | 160 | 2.0 |
| Comparative Example 2 | LLDPE: 10 μm/ polycycloolefin F: 20 μm | Initial 1 3 6 | 100 99.62 99.63 99.52 | 100 99.64 99.85 99.57 | 100 95.34 94.14 93.21 | 100 99.87 99.86 99.82 | 102 | 0 | 145 | 2.2 |
| Comparative Example 3 | PET 1 (PET-G): 30 μm | Initial 1 3 6 | 100 99.20 98.96 98.77 | 100 98.28 97.79 95.30 | 100 94.56 92.89 90.60 | 100 98.02 96.95 93.77 | 88 | 13 | 115 | 7.5 |
| Comparative Example 4 | PET 2: 30 μm | Initial 1 3 6 | 100 99.42 99.51 99.40 | 100 97.30 97.07 96.16 | 100 87.29 85.45 82.06 | 100 96.96 96.69 94.32 | 93 | 5 | 120 | 8.0 |
| Comparative Example 5 | PET 3: 30 μm | Initial 1 3 6 | 100 99.36 99.32 98.89 | 100 86.42 81.69 78.62 | 100 54.19 47.94 43.15 | 100 37.43 15.67 9.88 | 82 | 10 | 115 | 8.9 |
| Comparative Example 6 | EVOH: 30 μm | Initial 1 3 6 | 100 93.14 89.42 82.51 | 100 99.45 97.67 94.59 | 100 99.49 88.26 82.88 | 100 99.92 93.11 86.41 | 53 | 1 | 140 | 8.5 |
| Comparative Example 7 | PAN: 30 μm | Initial 1 3 6 | 100 99.64 99.66 99.57 | 100 99.99 99.98 99.99 | 100 99.95 99.91 99.89 | 100 99.99 99.98 99.98 | 104 | 10 | 110 | 30.2 |

From the results of Table 1, it is found that each of the multilayer films of Examples 1 to 7 including the sealant film that is a laminate of the polycycloolefin layer containing a polycycloolefin that is a copolymer of two or more kinds of specific cycloolefin polymers and has a glass transition temperature (Tg) less than or equal to 80° C. and the polyolefin layer is improved or even excellent in non-adsorption property and has appropriate seal strength and low-temperature sealing property, as well as has moisture resistance.

In contrast, in Comparative Examples 1 and 2 using a polycycloolefin having a Tg greater than 80° C., it is found that the seal strength is low and the seal rising temperature becomes high. Furthermore, in Comparative Examples 3 to 5 using a monolayer film composed of a PET compound as the sealant film, it is found that the moisture permeability becomes high, and further in Comparative Example 4, the seal strength is low and the seal rising temperature becomes high. Furthermore, in Comparative Example 6 using a monolayer film composed of EVOH as the sealant film, it is found that the seal strength is low, the seal rising temperature becomes high, and the moisture permeability also becomes high. Furthermore, in Comparative Example 7 using a monolayer film composed of PAN as the sealant film, it is found that the moisture permeability becomes extremely high.

<Sealant Film II>

It has been found that when sealant film I is used as a packaging bag, it may cause change in physical property such as discoloration (yellowing, bluish discoloration etc.) or occurrence of odor (ethylene gas odor etc.) due to γ-ray sterilization (γ-ray irradiation) of the content.

In response, further studies have been conducted to provide a sealant film that is improved or even excellent in low adsorption property, has sufficient seal strength, and is capable of suppressing change in physical property due to γ-ray irradiation.

Hereinafter, a description is made with reference to the drawings. The overlapping descriptions of sealant film I, multilayer film I and packaging bag I are omitted here.

Embodiment 2-1

Referring to FIG. 1, sealant film 1 of this embodiment is a sealant film made of two layers of polyolefin layer 11 (on the base sheet side) and polycycloolefin layer 12 (on the seal side).

(Polyolefin Layer: On Base Sheet Side)

Polyolefin layer 11 contains polyolefin. The content amount of polyolefin relative to the total amount of polyolefin layer 11 is preferably greater than or equal to 50% by mass, more preferably greater than or equal to 80% by mass, further preferably greater than or equal to 90% by mass.

As the polyolefin, polyethylene can be suitably used. As the polyethylene, for example, a low density polyethylene (LDPE) or linear low density polyethylene (LLDPE) can be suitably used.

The polyolefin layer may contain a material other than polyolefin. Examples of the other material include the same polycycloolefin as a main ingredient of the polycycloolefin layer described later. The polycycloolefin contained in the polyolefin layer is preferably the same type of polycycloolefin as that of polycycloolefin that is a main ingredient of the polycycloolefin layer.

When the polyolefin layer contains polycycloolefin, the mass of the polycycloolefin contained in polyolefin layer 11 is preferably less than or equal to 50% by mass relative to the mass of entire sealant film 1 (the total of polyolefin layer 11 and polycycloolefin layer 12). This is because when the mass of polycycloolefin exceeds 50% by mass, gamma-ray irradiation may cause bluish discoloration.

(Polycycloolefin Layer: On Seal Side)

Polycycloolefin layer 12 contains polycycloolefin as a main ingredient. The phrase "contain as a main ingredient" means, for example, that the content amount of polycycloolefin is greater than 50% by mass relative to the total amount of polycycloolefin layer 12, and the content amount of polycycloolefin is preferably greater than or equal to 80% by mass, more preferably greater than or equal to 90% by mass. Furthermore, other polymer materials, various additives or the like as disclosed in PTL 2 may be blended.

Sealant film 1 of this embodiment is provided with a layer composed of the polycycloolefin containing structural units derived from specific two or more kinds of the cycloolefin monomers as described above, with the result that it has non-adsorption property such that adsorption or absorption of contents (medicinal ingredient, fragrance ingredient, etc.) is suppressed, and also has sufficient seal strength.

Regarding the seal strength, specifically, the seal strength of the sealant film is preferably greater than or equal to 5.0 N/15 mm under a sealing condition of 140° C., 0.2 MPa, 1.0 second. The seal strength is measured according to JIS Z 0238.

In this embodiment, the thickness of polyolefin layer 11 is greater than or equal to 10 μm and less than or equal to 40 μm. The thickness of polycycloolefin layer 12 is greater than or equal to 5 μm and less than or equal to 20 μm. Designing the thickness of polyolefin layer 11 and the thickness of polycycloolefin layer 12 within such ranges makes it possible to provide sealant film 1 capable of suppressing change in physical property due to γ-ray irradiation. Examples of the change in physical property due to γ-ray irradiation include discoloration (yellowing or bluish discoloration) and occurrence of odor (ethylene gas odor etc.).

The thickness of each layer (polyolefin layer 11 and polycycloolefin layer 12) can be measured using the scale of a microscope by cutting the sealant film with a cutter or the like and then observing the cut surface with the microscope.

<Multilayer Film II>

Embodiment 2-2

Referring to FIG. 3, multilayer film 2 (packaging material) of this embodiment is a multilayer film obtained by stacking sealant film 1 of embodiment 2-1, adhesive layer 41 and base sheet 31 in this order. The thickness of the multilayer film is preferably less than or equal to 100 μm.

The multilayer film of this embodiment is provided with the sealant film of embodiment 2-1, with the result that it has non-adsorption property such that adsorption or absorption of contents (medicinal ingredient, fragrance ingredient, etc.) is suppressed, and also has sufficient seal strength and the like, similarly to embodiment 2-1, as well as is capable of suppressing change in physical property due to γ-ray sterilization.

Embodiment 2-3

Referring to FIG. 5, the multilayer film of this embodiment has gas barrier film 6 stacked in the middle in order to suppress degradation of contents due to oxygen gas, decrease of contents due to dissipation thereof to the outside, etc. Except for this point, it is in the same manner as in Embodiment 2-2. Note that it has adhesive layer 42 for adhering gas barrier film 6 such as an aluminum foil to sealant film 1.

<Packing Bag II>

The multilayer film formed as described above is used to form a packaging bag having a desired shape. For example, a pillow type packaging bag, gusset type packaging bag, self-standing type packaging bag etc. (see PTL 1) may be produced depending on the purpose (design of the packaging bag, amount of contents, ease of use etc.). In such a packaging bag, at least two of the above-mentioned multilayer films are sealed at least in part such that the sealant films are fused to each other.

Hereinafter, a more detailed description is made of the present invention with reference to examples, but the present invention is not limited thereto.

Examples 2-1 to 2-12, Comparative Examples 2-1 to 2-8

Similar to embodiment 2-3, base sheet 31, gas barrier film 6 and sealant film 1 of embodiment 2-1 were stacked with a two-component curing type polyester and a polyurethane adhesive interposed therebetween to produce multilayer films 2 of Examples 2-1 to 2-12 and Comparative Examples 2-1 to 2-8.

Base sheet 31 is made of polyethylene terephthalate (PET). Gas barrier film 6 is an aluminum foil. The thickness of base sheet 31 is 12 μm, and the thickness of gas barrier film 6 is 7 μm.

Sealant film 1 is made of polyolefin layer 11 and polycycloolefin layer 12. The thickness of polyolefin layer 11 and the thickness of polycycloolefin layer 12 are as shown in Table 2.

In Examples 2-1 to 2-10 and Comparative Examples 2-1 to 2-7, the polyolefin (PO) layer is made of linear low density polyethylene (LLDPE). In Examples 2-11, 2-12 and Comparative Example 2-8, the polyolefin layer is made of LLDPE and following polycycloolefin A. In Examples 2-11, 2-12 and Comparative Example 2-8, the content amount of polycycloolefin (PCO) relative to the mass of entire sealant film 1 is 50, 30 and 60% by mass, respectively.

In Examples 2-1 to 2-12 and Comparative Examples 2-1 to 2-8, the polycycloolefin (PCO) layer is made of following polycycloolefin A.

Polycycloolefin A: that is a ternary copolymer of three kinds of cycloolefin monomers made of tricyclo $[5.2.1.0^{2,6}]$ deca-3,8-diene, tetracyclo $[4.4.0.1^{2,5}.1^{7,10}]$-3-dodecene, and bicyclo [2.2.1] hept-2-ene, and obtained by ring-opening metathesis copolymerization of these cycloolefin monomers, followed by hydrogenation of C—C double bonds.

<Evaluation Test>

For Examples 2-1 to 2-12 and Comparative Examples 2-1 to 2-8, the following evaluation tests were conducted before and after γ-ray irradiation. The amount of γ-ray irradiation was set to 15 kGy that is the dose for general γ-ray sterilization.

(Evaluation Test 2-1)

As an evaluation test 2-1, colorimetric evaluation was performed.

Specifically, for each of the multilayer films of Examples 2-1 to 2-12 and Comparative Examples 2-1 to 2-8, value L, value a and value b were measured using a colorimeter ("X-Rite": Videojet X-Rite K.K.). The measurement results are shown in Table 2.

(Evaluation Test 2-2)

As an evaluation test 2-2, the "seal strength" was evaluated.

Specifically, the multilayer films of Examples 2-1 to 2-12 and Comparative Examples 2-1 to 2-8 were individually sealed with the sealant films facing inwardly. For the sealing condition, the sealing temperature was 170° C., the sealing pressure was 0.2 MPa and the sealing time was 1.0 second. The peel strength (seal strength) (N/15 mm) of two sealed multilayer films was measured for the strip-shaped cut multilayer films based on JIS Z 0238. Note that the seal strength was measured at a point where the seal strength curve was stable.

(Evaluation Test 2-3)

As an evaluation test 2-3, the "lamination strength" was evaluated.

Specifically, each of the multilayer films of Examples 2-1 to 2-12 and Comparative Examples 2-1 to 2-8 was measured for the lamination strength between the sealant film and the aluminum foil.

The results of evaluation tests 2-1 to 2-3 are shown in Table 1. In the rightmost column "EVALUATION" in Table 2, "A" indicates that it was determined that there was no change in physical property due to γ-ray irradiation, "NG" indicates that it was determined that change in physical property occurred due to γ-ray irradiation. In the column "REMARK", contents of changes in physical property due to γ-ray irradiation were shown, including evaluations other than those of evaluation tests 2-1 to 2-3.

For the polycycloolefin layers used in Examples 2-1 to 2-12 and Comparative Examples 2-1 to 2-8, the glass transition temperatures (Tg) measured based on JIS K 7121 using a differential scanning calorimeter were 70° C.

TABLE 2

| | Layer thickness (μm) | | Before γ-ray irradiation | | | | | After γ-ray irradiation | | | | | | |
|---|---|---|---|---|---|---|---|---|---|---|---|---|---|---|
| | | | Result of colorimetry | | | Seal strength | Lamination strength | Result of colorimetry | | | Seal strength | Lamination strength | | |
| | PO layer | PCO layer | Value L | Value a | Value b | (N/15 mm) | (N/15 mm) | Value L | Value a | Value b | (N/15 mm) | (N/15 mm) | Remark | Evaluation |
| Example 2-1 | 40 | 5 | 82 | −0.7 | −0.9 | 34 | 6 | 82 | −0.7 | −0.9 | 34 | 6 | — | A |
| Example 2-2 | 40 | 10 | 82 | −0.7 | −0.9 | 30 | 6 | 82 | −0.7 | −0.9 | 30 | 6 | — | A |
| Example 2-3 | 40 | 15 | 81 | −0.9 | −0.9 | 25 | 6 | 81 | −0.9 | −0.9 | 25 | 6 | — | A |
| Example 2-4 | 40 | 20 | 79 | −1.2 | −1.1 | 20 | 6 | 79 | −1.3 | −1.1 | 20 | 6 | — | A |
| Example 2-5 | 10 | 5 | 82 | −0.7 | −3.0 | 25 | 6 | 82 | −0.9 | −3.0 | 25 | 6 | — | A |
| Example 2-6 | 10 | 10 | 82 | −0.7 | −3.1 | 20 | 6 | 82 | −0.7 | −3.1 | 20 | 6 | — | A |
| Example 2-7 | 10 | 5 | 80 | −0.9 | −3.1 | 25 | 6 | 80 | −0.9 | −3.2 | 20 | 6 | — | A |
| Example 2-8 | 10 | 20 | 78 | −1.1 | −3.2 | 20 | 6 | 78 | −1.3 | −3.6 | 20 | 6 | — | A |
| Example 2-9 | 15 | 15 | 70 | −0.9 | −1.8 | 20 | 6 | 70 | −0.9 | −1.8 | 20 | 6 | — | A |
| Example 2-10 | 20 | 10 | 74 | −0.7 | −0.9 | 20 | 6 | 74 | −0.7 | −0.9 | 20 | 6 | — | A |
| Example 2-11 | 40 PCO 50% | 5 | 82 | −1.1 | −0.9 | 34 | 6 | 82 | −1.3 | −0.9 | 34 | 6 | — | A |
| Example 2-12 | 40 PCO 30% | 10 | 82 | −0.8 | −0.9 | 30 | 6 | 82 | −0.9 | −0.9 | 30 | 6 | — | A |
| Comparative Example 2-1 | 40 | 0 | 68 | −1.2 | −4 | 40 | 6 | 63 | −1.2 | −2 | 36 | 5 | Yellowing Odor No low adsorption property | NG |
| Comparative Example 2-2 | 50 | 5 | 82 | −0.7 | −0.9 | 38 | 6 | 82 | −0.7 | −0.4 | 38 | 6 | Odor | NG |
| Comparative Example 2-3 | 50 | 10 | 82 | −0.7 | −0.9 | 34 | 6 | 82 | −0.7 | −0.3 | 34 | 6 | Odor | NG |
| Comparative Example 2-4 | 50 | 15 | 82 | −0.7 | −0.9 | 25 | 6 | 82 | −0.7 | −0.3 | 25 | 6 | Odor | NG |
| Comparative Example 2-5 | 50 | 20 | 80 | −0.7 | −0.9 | 20 | 6 | 80 | −1 | −0.3 | 20 | 6 | Odor | NG |
| Comparative Example 2-6 | 0 | 30 | 68 | −0.7 | −0.9 | 18 | 6 | 68 | −1.7 | −0.9 | 18 | 6 | Bluish | NG |
| Comparative Example 2-7 | 20 | 30 | 74 | −0.7 | −0.9 | 18 | 6 | 74 | −1.6 | −0.5 | 18 | 6 | Bluish | NG |
| Comparative Example 2-8 | 40 PCO 60% | 10 | 80 | −0.7 | −0.9 | 30 | 6 | 80 | −1.6 | −0.5 | 30 | 6 | Bluish | NG |

As can be seen from Comparative Example 2-1, it is found that in the absence of the polycycloolefin (PCO) layer, yellowing, occurrence of odor etc. are caused due to γ-ray irradiation.

As a result of the study by the present inventors, it has been previously found that each of the multilayer films of Examples 2-1 to 2-12 including the sealant film that is a laminate of the polycycloolefin layer containing a polycycloolefin that is a copolymer of two or more kinds of specific cycloolefin polymers and has a glass transition temperature (Tg) less than or equal to 80° C. and the polyolefin layer is improved or even excellent in non-adsorption property and has appropriate seal strength and low-temperature sealing property, as well as has moisture resistance. However, since the sealant film of Comparative Example 1 has no PCO layer, it does not have non-adsorption property (low adsorption property).

In Comparative Examples 2-2 to 2-5 where the thickness of polyolefin (PO) layer 11 was 50 μm (greater than 40 μm), odor occurred due to γ-ray irradiation. On the other hand, in Comparative Examples 2-6 and 2-7 where the thickness of the PCO layer was 30 μm (greater than 20 μm), bluish discoloration occurred due to γ-ray irradiation.

In contrast, in Examples 2-1 to 2-10 where the thickness of the polyolefin layer was greater than or equal to 10 μm and less than or equal to 40 μm and the thickness of polycycloolefin layer 12 was greater than or equal to 5 μm and less than or equal to 20 μm, neither discoloration nor occurrence of odor was caused.

Accordingly, it is conceivable that when the thickness of the polyolefin layer is greater than or equal to 10 μm and less than or equal to 40 μm and the thickness of polycycloolefin layer 12 is greater than or equal to 5 μm and less than or equal to 20 μm, it is possible to obtain sealant film 1 that can suppress change in physical property due to γ-ray irradiation (discoloration (yellowing or bluish discoloration), occurrence of odor (ethylene gas odor etc.) etc.).

When the polyolefin layer contains polycycloolefin, in Comparative Example 2-8 where the content amount of polycycloolefin contained in the polyolefin layer was 60% by mass (greater than 50% by mass) relative to the mass of the entire sealant film, bluish discoloration occurred due to γ-ray irradiation.

In contrast, in Examples 2-11 and 2-12 where the content amount of polycycloolefin contained in the polyolefin layer was 50 and 30% by mass (less than or equal to 50% by mass) relative to the mass of the entire sealant film, neither discoloration nor occurrence of odor was caused.

Accordingly, it is conceivable that when the polyolefin layer contains polycycloolefin, the mass of the polycycloolefin contained in the polyolefin layer is preferably less than or equal to 50% by mass relative to the mass of the entire sealant film.

<Sealant Film III>

It has been found that sealant film I may not satisfy the MAX strength (greater than or equal to 23 N/15 mm) required when used for a packaging bag.

In response, further studies have been conducted to provide a sealant film that is improved or even excellent in low adsorption property and has a MAX strength greater than or equal to 23 N/15 mm.

Hereinafter, a description is made with reference to the drawings. The overlapping descriptions of sealant film I, multilayer film I and packaging bag I are omitted here.

Embodiment 3-1

Referring to FIG. 1, sealant film 1 of this embodiment is a sealant film made of two layers of polyolefin layer 11 (on the base sheet side) and polycycloolefin layer 12 (on the seal side).

(Polyolefin Layer: On Base Sheet Side)

Polyolefin layer 11 contains polyolefin. The content amount of polyolefin relative to the total amount of polyolefin layer 11 is preferably greater than or equal to 50% by mass, more preferably greater than or equal to 80% by mass, further preferably greater than or equal to 90% by mass. Polyolefin layer 11 may contain a material other than polyolefin.

As the polyolefin, polyethylene can be suitably used. As the polyethylene, for example, a low density polyethylene (LDPE) or linear low density polyethylene (LLDPE) can be suitably used.

(Polycycloolefin Layer: On Seal Side)

Polycycloolefin layer 12 contains polycycloolefin as a main ingredient. The phrase "contain as a main ingredient" means, for example, that the content amount of polycycloolefin is greater than 50% by mass relative to the total amount of polycycloolefin layer 12, and the content amount of polycycloolefin is preferably greater than or equal to 80% by mass, more preferably greater than or equal to 90% by mass. Furthermore, other polymer materials, various additives or the like as disclosed in PTL 2 may be blended.

Sealant film 1 of this embodiment is provided with a layer composed of the polycycloolefin containing structural units derived from specific two or more kinds of the cycloolefin monomers as described above, with the result that it has non-adsorption property such that adsorption or absorption of contents (medicinal ingredient, fragrance ingredient, etc.) is suppressed, and also has sufficient seal strength.

In this embodiment, the thickness (T2) of polycycloolefin layer 12 is greater than or equal to 5 μm and less than or equal to 10 μm. The ratio (a: T1/T2) of the thickness (T1) of polyolefin layer 11 to thickness (T2) of polycycloolefin layer 12 is greater than or equal to 3 and less than or equal to 9.

The thickness of each layer (polyolefin layer 11 and polycycloolefin layer 12) can be measured using the scale of a microscope by cutting the sealant film with a cutter or the like and then observing the cut surface with the microscope.

Designing thickness (T1) of polyolefin layer 11 and thickness (T2) of polycycloolefin layer 12 within such ranges makes it possible to provide sealant film 1 that is improved or even excellent in low adsorption property and has a MAX strength greater than or equal to 23 N/15 mm.

Here, the MAX strength is not an initial seal strength or the like, but a seal strength when the seal strength curve reaches the maximum and becomes stable. In the specification for retort (JIS Z 0238), it is stipulated that the MAX strength is greater than or equal to 23 N/15 mm. The seal strength (MAX strength) can be measured according to JIS Z 0238.

<Multilayer Film III>

Embodiment 3-2

Referring to FIG. 3, multilayer film 2 (packaging material) of this embodiment is a multilayer film obtained by stacking sealant film 1 of embodiment 3-1, adhesive layer 41 and base sheet 31 in this order. The thickness of the multilayer film is preferably less than or equal to 100 μm.

The multilayer film of this embodiment is provided with the sealant film of embodiment 3-1, with the result that it has non-adsorption property such that adsorption or absorption of contents (medicinal ingredient, fragrance ingredient, etc.) is suppressed, and also has sufficient seal strength and the like, similarly to embodiment 3-1, as well as has a MAX strength greater than or equal to 23 N/15 mm.

Embodiment 3-3

Referring to FIG. 5, the multilayer film of this embodiment has gas barrier film 6 stacked in the middle in order to suppress degradation of contents due to oxygen gas, decrease of contents due to dissipation thereof to the outside, etc. Except for this point, it is in the same manner as in Embodiment 3-2. Note that it has adhesive layer 42 for adhering gas barrier film 6 such as an aluminum foil to sealant film 1.

<Packing Bag III>

The multilayer film formed as described above is used to form a packaging bag having a desired shape. For example, a pillow type packaging bag, gusset type packaging bag, self-standing type packaging bag etc. (see PTL 1) may be produced depending on the purpose (design of the packaging bag, amount of contents, ease of use etc.). In such a packaging bag, at least two of the above-mentioned multilayer films are sealed at least in part such that the sealant films are fused to each other.

Hereinafter, a more detailed description is made of the present invention with reference to examples, but the present invention is not limited thereto.

Examples 3-1 to 3-5, Comparative Examples 3-1 to 3-5

Similar to embodiment 3-2, base sheet 31 and sealant film 1 of embodiment 3-1 were stacked with a two-component curing type polyester and a polyurethane adhesive interposed therebetween to produce multilayer films of Examples 3-1 to 3-5 and Comparative Examples 3-1 to 3-5.

Base sheet 31 is made of polyethylene terephthalate (PET). The thickness of base sheet 31 is 12 μm.

Sealant film 1 is made of polyolefin layer 11 and polycycloolefin layer 12. The polyolefin (PO) layer is made of linear low density polyethylene (LLDPE).

The polycycloolefin (PCO) layer is made of following polycycloolefin A.

Polycycloolefin A:
that is a ternary copolymer of three kinds of cycloolefin monomers made of tricyclo [$5.2.1.0^{2,6}$] deca-3,8-diene, tetracyclo [$4.4.0.1^{2,5}.1^{7,10}$]-3-dodecene, and bicyclo [2.2.1] hept-2-ene, and obtained by ring-opening metathesis copolymerization of these cycloolefin monomers, followed by hydrogenation of C—C double bonds.

The thickness of polyolefin (PO) layer 11 and the thickness of polycycloolefin (PCO) layer 12 are as shown in Table 3.

Examples 3-6 to 3-12, Comparative Examples 3-6 to 3-12

Similar to embodiment 3-3, base sheet 31, gas barrier film 6 and sealant film 1 of embodiment 3-1 were stacked with a two-component curing type polyester and a polyurethane adhesive interposed therebetween to produce multilayer films of Examples 3-6 to 3-12 and Comparative Examples 3-6 to 3-12.

Base sheet 31 is made of polyethylene terephthalate (PET). Gas barrier film 6 is an aluminum foil. The thickness of base sheet 31 is 12 μm, and the thickness of gas barrier film 6 is 7 μm.

Sealant film 1 is made of polyolefin layer 11 and polycycloolefin layer 12. The polyolefin (PO) layer is made of linear low density polyethylene (LLDPE).

The polycycloolefin (PCO) layer is made of above-mentioned polycycloolefin A.

The thickness of polyolefin (PO) layer 11 and the thickness of polycycloolefin (PCO) layer 12 are as shown in Table 3.

<Evaluation Test 3-1>

For Examples 3-1 to 3-12 and Comparative Examples 3-1 to 3-12, the "seal strength" (MAX strength) was evaluated.

Specifically, the multilayer films of Examples 3-1 to 3-12 and Comparative Examples 3-1 to 3-12 were individually sealed with the sealant films facing inwardly. For the sealing condition, the sealing temperature was 170° C., the sealing pressure was 0.2 MPa and the sealing time was 1.0 second. The peel strength (seal strength) (N/15 mm) of two sealed multilayer films was measured for the strip-shaped cut multilayer films based on JIS Z 0238. Note that the maximum value of the seal strength was measured as the MAX strength at a point where the seal strength curve was stable.

<Evaluation Test 3-2>

For Examples 3-6 to 3-12 and Comparative Examples 3-6 to 3-12, the low adsorption property was evaluated.

Specifically, the multilayer films of Examples 3-6 to 3-12 and Comparative Examples 3-6 to 3-12 cut into a predetermined shape were individually placed on a bag making machine in a state where two multilayer films were stacked such that the sealant films were in contact with each other, and then the predetermined areas were sealed to prepare a three-way sealed type packaging bag. At this point in time, in order to fill the packaging bag with a content, the upper end (top seal portion) of the packaging bag had not yet been sealed.

Next, through the upper end of the above-mentioned packaging bag, the packaging bag was filled with 1-menthol under a nitrogen atmosphere, and then the upper end (top seal portion) of the packaging bag was sealed to seal the content. Note that this ingredient is an ingredient that is generally easily adsorbed to a sealant film.

The packaging bag accommodating the content as described above was stored in a thermostatic chamber maintained at 40° C. for 0, 1, 3 or 6 months (M). After storage, the packaging bag was opened, each ingredient was extracted by ethanol extract only from inside the sealant films, and the amount of each extracted ingredient was measured using a high performance liquid chromatography. Based on the measured values, a ratio of the residual amount after each storage period to the initial amount was calculated as the residual ratio (%).

In Examples 3-6 to 3-12 and Comparative Examples 3-6 to 3-12, because the gas barrier film (aluminum (AL) foil) is provided and thus absorption from the contents into the base can be prevented, it is possible to evaluate the adsorption property with respect to the sealant film.

The results of evaluation tests 3-1 and 3-2 are shown in Table 3. In the column "PEELED SURFACE", the state of the surface (peeled surface) where the peeling is caused in Evaluation test 3-1 is described.

For each of the polycycloolefin layers used in Examples 3-1 to 3-12 and Comparative Examples 3-1 to 3-12, the glass transition temperature (Tg) measured based on JIS K 7121 using a differential scanning calorimeter was 70° C.

TABLE 3

| | Structure of multilayer film | Layer thickness (μ) PO layer (T1) | Layer thickness (μ) PCO layer (T2) | a (T1/T2) | Max strength (N/15 mm) | Peeled surface | Low adsorption property (Residual ratio %) 0M | 1M | 3M | 6M |
|---|---|---|---|---|---|---|---|---|---|---|
| Example 3-1 | Base (PET) 12 μm/ sealant film | 15 | 5 | 3 | 25 | Migrate from PCO layer to PO layer | — | | | |
| Example 3-2 | | 25 | 5 | 5 | 30 | | | | | |
| Example 3-3 | | 30 | 10 | 3 | 32 | | | | | |
| Example 3-4 | | 40 | 10 | 4 | 30 | | | | | |
| Example 3-5 | | 80 | 10 | 9 | 40 | | | | | |
| Comparative Example 3-1 | | 9 | 3 | 3 | 15 | Migrate from PCO layer to PO layer, but PO layer does not stretch | | | | |
| Comparative Example 3-2 | | 10 | 5 | 2 | 18 | | | | | |
| Comparative Example 3-3 | | 20 | 10 | 2 | 20 | | | | | |
| Comparative Example 3-4 | | 45 | 15 | 3 | 20 | In PCO layer | | | | |
| Comparative Example 3-5 | | 10 | 20 | 0.5 | 20 | | | | | |
| Example 3-6 | Base (PET) 12 μm/gas barrier film (AL) 7 μm/sealant film | 15 | 5 | 3 | 25 | Migrate from PCO layer to PO layer | 100 | 99.8 | 99.1 | 98.4 |
| Example 3-7 | | 25 | 5 | 5 | 33 | | 100 | 99.6 | 99.8 | 98.6 |
| Example 3-8 | | 45 | 5 | 9 | 34 | | 100 | 99.3 | 98.5 | 97.4 |
| Example 3-9 | | 40 | 10 | 4 | 30 | | 100 | 99.5 | 98.7 | 97.8 |
| Example 3-10 | | 80 | 10 | 7 | 38 | | 100 | 99.0 | 98.1 | 95.6 |
| Example 3-11 | | 90 | 10 | 9 | 40 | | 100 | 98.6 | 97.4 | 93.1 |
| Example 3-12 | | 30 | 10 | 3 | 32 | | 100 | 99.3 | 98.6 | 97.0 |
| Comparative Example 3-6 | | 9 | 3 | 3 | 15 | Migrate from PCO layer to PO layer, but PO layer does not stretch | — | | | |
| Comparative Example 3-7 | | 10 | 5 | 2 | 18 | | | | | |
| Comparative Example 3-8 | | 20 | 10 | 2 | 20 | | | | | |
| Comparative Example 3-9 | | 50 | 5 | 10 | 35 | Migrate from PCO layer to PO layer | 100 | 98.2 | 98.8 | 89.9 |
| Comparative Example 3-10 | | 100 | 10 | 10 | 40 | | 100 | 97.2 | 91.8 | 87.9 |
| Comparative Example 3-11 | | 45 | 15 | 3 | 20 | In PCO layer | 100 | 99.3 | 98.8 | 98.3 |
| Comparative Example 3-12 | | 10 | 20 | 0.5 | 20 | | 100 | 99.8 | 99.5 | 99.3 |

As shown in Table 3, in Examples 3-1 to 3-12 where thickness (T2) of the polycycloolefin layer is greater than or equal to 5 μm and less than or equal to 10 μm and the ratio (a) of thickness (T1) of the polyolefin layer to thickness (T2) of the polycycloolefin layer is greater than or equal to 3 and less than or equal to 9, it is found that a MAX strength greater than or equal to 23 N/15 mm is imparted.

In contrast, in Comparative Examples 1 to 8, 11 and 12 where T2 and a (T1/T2) are outside the above ranges, the MAX strength is less than 23 N/15 mm.

It is conceivable that this is because, as described in the section for the peeled surface in Table 1, in Examples 3-1 to 3-12, reducing the thickness of the PCO layer to some extent allows the peeling to start with the PCO layer having low strength, and on the way the peeled surface to migrate to the PO layer having high strength, so that the MAX strength increases.

On the other hand, it is conceivable that, as in Comparative Examples 3-4, 3-5, 3-11 and 3-12, as the thickness of the PCO layer increases, the peeling starts with the PCO layer, and the peeled surface remains in the PCO layer having low strength, so that the MAX strength does not increase. Furthermore, it is conceivable that, as in Comparative Examples 3-1 to 3-3 and 3-6 to 3-8, even in a case where the PCO layer is thinned, when the PO layer is also thin (when ratio a is small), although the peeling starts with the PCO layer, and on the way the peeled surface migrates to the PO layer having high strength, the PO layer does not sufficiently stretch, so that the MAX strength does not increase.

Furthermore, from the evaluation results of the low adsorption property (residual ratio) for Examples 3-6 to 3-12, it is found that the sealant film of the present invention is improved or even excellent in low adsorption property. This is because the sealant film is a laminate of the polycycloolefin layer containing a polycycloolefin that is a copolymer of two or more kinds of specific cycloolefin polymers and has a glass transition temperature (Tg) less than or equal to 80° C. and the polyolefin layer.

In Comparative Examples 3-9 and 3-10 where T2 is within the above range and a (T1/T2) exceeds 9, it is found that although the MAX strength is greater than or equal to 23 N/15 mm, the low adsorption property deteriorates (in particular, when the concentration of the content becomes high). It is conceivable that this is because when the PO layer becomes thicker, the amount of adsorption to the PO layer increases so that the low adsorption property deteriorates.

From the above results, when thickness (T2) of the polycycloolefin layer is greater than or equal to 5 μm and less than or equal to 10 μm and ratio (a) of thickness (T1) of the polyolefin layer to thickness (T2) of the polycycloolefin layer is greater than or equal to 3 and less than or equal to 9, it is conceivable that sealant film 1 that is improved or even excellent in low adsorption property and has a MAX strength greater than or equal to 23 N/15 mm can be obtained.

It should be considered that the embodiments and examples now disclosed are illustrative in all respects and not intended to be limiting. The scope of the present invention is defined not by the description above but by the claims, and is intended to include all modifications within the meaning equivalent to the claims and the scope of the claims.

INDUSTRIAL APPLICABILITY

The sealant film of the present invention can be used as an innermost layer of a multilayer film constituting a packaging bag.

REFERENCE SIGNS LIST

1: Sealant film, 11: Polyolefin layer, 12: Polycycloolefin layer, 13: Blend layer, 2: Multilayer film, 31, 32, 33: Base sheet, 41, 42: Adhesive layer, 43: Anchor coat layer, 51, 52: Extruded PE layer, 6: Gas barrier film.

The invention claimed is:

1. A sealant film comprising:
a polyolefin layer containing greater than or equal to 90 mass % of polyolefin; and
a polycycloolefin layer as an outermost layer containing greater than or equal to 90 mass % of polycycloolefin,
wherein the polycycloolefin of the polycycloolefin layer is a ternary copolymer made of structural units selected from a structural unit (A) derived from a dicyclopentadiene compound, a structural unit (B) derived from a tetracyclododecene compound, and a structural unit (C) derived from a norbornene compound,
wherein the dicyclopentadiene compound is tricyclo $[5.2.1.0^{2,6}]$ deca-3,8-diene, the tetracyclododecene compound is tetracyclo $[4.4.0.1^{2,5}0.1^{7,10}]$-3-dodecene, and the norbornene compound is bicyclo $[2.2.1]$ hept-2-ene.

2. The sealant film according to claim 1, wherein the polycycloolefin of the polycycloolefin layer is a ring-opening metathesis polymer of the ternary copolymer made of tricyclo $[5.2.1.0^{2,6}]$ deca-3,8-diene, tetracyclo $[4.4.0.1^{2,5}0.1^{7,10}]$-3-dodecene, and bicyclo $[2.2.1]$ hept-2-ene, and carbon-carbon double bonds are hydrogenated.

3. A multilayer film comprising:
a base sheet; and
the sealant film according to claim 1,
the sealant film being stacked on the base sheet.

4. The multilayer film according to claim 3, further comprising a gas barrier film stacked between the base sheet and the sealant film.

5. The multilayer film according to claim 3 having a thickness less than or equal to 100 μm.

6. A packaging bag comprising two of the multilayer films according to claim 3 sealed such that the sealant films of said multilayer films are fused to each other.

7. The sealant film of claim 1, wherein
the polyolefin layer has a thickness greater than or equal to 10 μm and less than or equal to 40 μm, and
the polycycloolefin layer has a thickness greater than or equal to 5 μm and less than or equal to 20 μm.

8. The sealant film of claim 1, wherein
the polycycloolefin layer has a thickness (T2) greater than or equal to 5 μm and less than or equal to 10 μm, and
a ratio (a) of a thickness (T1) of the polyolefin layer to the thickness (T2) of the polycycloolefin layer is greater than or equal to 3 and less than or equal to 9.

9. The sealant film according to claim 1, wherein the polycycloolefin of the polycycloolefin layer contains 5 to 80 mol % of the structural unit (A) derived from a dicyclopentadiene compound, 10-90 mol % of the structural unit (B) derived from a tetracyclododecene compound and 5 to 50 mol % the structural unit (C) derived from a norbornene compound, and wherein the structural units (A), (B) and (C) together form 100 mol %.

\* \* \* \* \*